No. 699,620. Patented May 6, 1902.
T. D. HANKINS & F. J. BOOHER.
VAULT OR GRAVE.
(Application filed Jan. 11, 1902.)
(No Model.)

Witnesses:
Elmer Seavey
C. O. Davis

Inventors
Theodore D. Hankins
Flavius J. Booher
By R. W. Bishop
Attorney

UNITED STATES PATENT OFFICE.

THEODORE D. HANKINS AND FLAVIUS J. BOOHER, OF NEW ROSS, INDIANA.

VAULT OR GRAVE.

SPECIFICATION forming part of Letters Patent No. 699,620, dated May 6, 1902.

Application filed January 11, 1902. Serial No. 89,292. (No model.)

*To all whom it may concern:*

Be it known that we, THEODORE D. HANKINS and FLAVIUS J. BOOHER, citizens of the United States of America, residing at New Ross, in the county of Montgomery and State of Indiana, have invented certain new and useful Improvements in Vaults or Graves, of which the following is such a full, clear, and exact description as will enable others skilled in the art to which it appertains to make and use the same, reference being had to the accompanying drawings, forming a part hereof.

Our invention relates to the construction of graves or vaults, and has for its object the provision of means whereby robbing of graves will be prevented and the washing away of graves will be overcome at a slight cost.

With this object in view the invention consists in certain novel features of the vault shown in the accompanying drawings, as will be hereinafter first fully described and then particularly pointed out in the claims.

Figure 1:
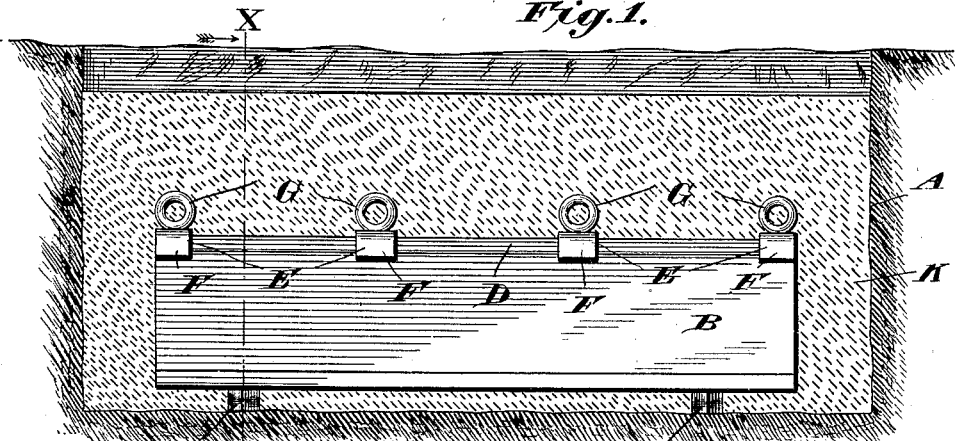
Figure 2:
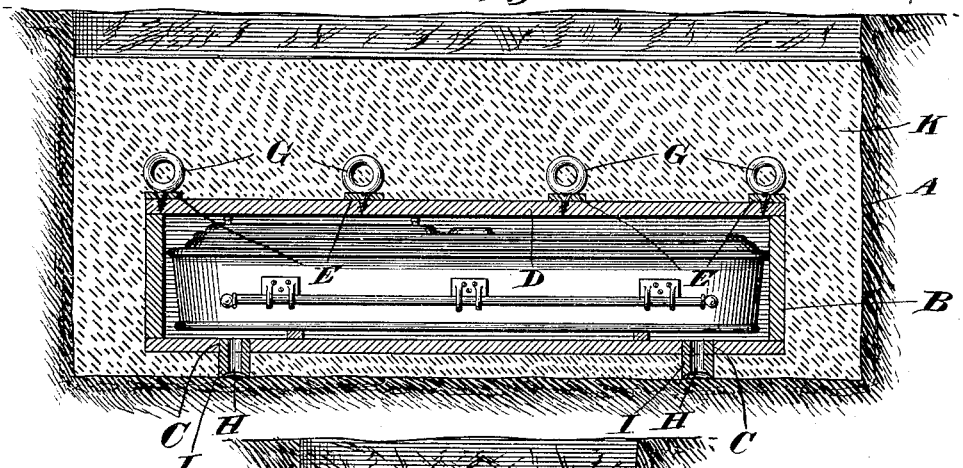
Figure 3:
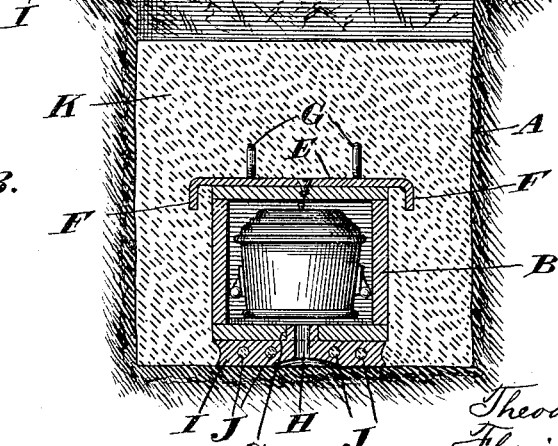

In the drawings, mention of which has just been made, Figure 1 is a view showing the grave in longitudinal section with the casket-box therein in elevation. Fig. 2 is a longitudinal section taken centrally through the casket-box, and Fig. 3 is a transverse section taken on the line $x$ $x$ of Fig. 1.

The grave A is prepared in the usual manner, but is made larger than is now the common practice in order to provide space for the cement filling, to be presently described.

The casket-box B is prepared with openings C near its ends, and on its lid D we secure the cross bars or straps E, which extend beyond the sides of the lid and have their ends formed into hooks or lips F. On the upper sides of these cross-bars are rings or loops G, which may be formed integral with the cross-bars and will preferably be so formed in order to secure the greatest strength. The casket-box may be placed directly on the ground forming the bottom of the grave; but we prefer to fit tubes H in the openings C and provide rests I, constructed as an integral part of the said tubes and extending transversely across the bottom of the box. The tube-opening is continued through the rests, and horizontal eyes or perforations J are formed in the rests between their ends and the tube-openings, as shown most clearly in Fig. 3. After the grave has been dug the box is lowered thereinto and adjusted to the center thereof, so as to leave an opening or space between the walls of the grave and the sides and ends of the box. A moistened mixture of cement and sand or pulverized stone K is poured into the space between the box and the walls of the grave. This mixture may be poured in before the interment of the body, in which case it will not be brought up to the level of the top of the box. The casket or coffin is lowered into the box in the usual manner, after which the casket-box lid is lowered onto the box and then the cement mixture is poured into the grave, so as to entirely cover the box and the rings or loops on the lid. The grave is then filled with earth, as in the ordinary burial. When the rests on the bottom of the box are employed, the bottom of the grave is slightly flooded with water after the box has been placed in position and the cement mixture emptied into the grave, so as to spread under the box and coalesce beneath the same, passing through the perforations J, and thereby securing the box firmly in its position and forming a solid waterproof bottom for the grave. The tubular openings in the rests will extend through this concrete or cement bottom, and thereby permit the gases and fluids incident to decomposition to pass off into the ground. The cross-bars on the lid of the box will be embedded firmly in the solid cement wall, and the rings or loops thereon will likewise be embedded, so that the box will not only be surrounded by an impervious stone wall or casing, but will also be physically connected therewith, and desecration of the grave will be rendered practically impossible. The rings or loops furnish means for lowering the lid, as the ropes or cords used for this purpose may be passed through the rings.

It will be readily seen from the foregoing description that our invention surrounds the casket and the body contained therein with a solid waterproof casing, which protects the same from dampness, while at the same time the gases and liquids of decomposition are permitted to escape into the earth. This waterproof casing forms a solid stone wall in which cross-bars and rings with angular lips or hooks are so set or embedded that the grave is practically impregnable from above.

Having thus described our invention, what we claim, and desire to secure by Letters Letters Patent, is—

1. A burial-vault or grave comprising a casket-box having cross-bars on its top, and a wall surrounding the said box, the ends of the cross-bars projecting beyond the sides of the box and being embedded in the wall.

2. A burial-vault or grave comprising a casket-box, cross-bars permanently secured on the top of the box, permanent loops or rings rising from the cross-bars, and an impervious wall surrounding said box in which said cross-bars and loops or rings are embedded.

3. The combination with an impervious wall and a casket-box surrounded closely by said wall, of cross-bars on the top of said box having lips at their ends embedded in said wall, and rings rising from the cross-bars and likewise embedded in the said wall.

4. In a burial-vault, the combination with an impervious wall, and a casket-box surrounded thereby and having openings in its bottom near its ends, of tubes inserted in said openings and having rests on their lower ends beneath the box embedded in the said wall, the openings of the tubes extending through the said rests and the said rests having horizontal openings through which the material of the wall passes.

In testimony whereof we have signed this specification in the presence of two subscribing witnesses.

THEODORE D. HANKINS.
FLAVIUS J. BOOHER.

Witnesses:
HARRY N. FINE,
EDWIN F. GREIST.